(12) United States Patent
Lark et al.

(10) Patent No.: US 11,676,464 B2
(45) Date of Patent: *Jun. 13, 2023

(54) BODY MOUNTED CAMERA SYSTEM FOR MONITORING DELIVERIES

(71) Applicant: Walmart Apollo, LLC, Bentonville, AR (US)

(72) Inventors: Walter Lark, Brooklyn, NY (US); Bart Stein, Stony Brook, NY (US); Thomas Nguyen, Brooklyn, NY (US); Brett Provance, New York, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,330

(22) Filed: Aug. 9, 2021

(65) Prior Publication Data

US 2021/0407268 A1 Dec. 30, 2021

Related U.S. Application Data

(63) Continuation of application No. 16/450,044, filed on Jun. 24, 2019, now Pat. No. 11,087,602.

(60) Provisional application No. 62/692,294, filed on Jun. 29, 2018.

(51) Int. Cl.
| | |
|---|---|
| *G08B 13/196* | (2006.01) |
| *G03B 17/00* | (2021.01) |
| *H04W 84/12* | (2009.01) |
| *G07C 9/30* | (2020.01) |
| *H04W 12/64* | (2021.01) |

(52) U.S. Cl.
CPC ....... *G08B 13/19621* (2013.01); *G03B 17/00* (2013.01); *G07C 9/30* (2020.01); *H04W 12/64* (2021.01); *H04W 84/12* (2013.01)

(58) Field of Classification Search
CPC ...... H04N 7/186; G08B 13/196; G08B 17/00; G06K 9/00
See application file for complete search history.

(56) References Cited

U.S. PATENT DOCUMENTS

| | | | |
|---|---|---|---|
| 6,323,782 B1 * | 11/2001 | Stephens | G07C 9/00571 340/5.73 |
| 9,230,250 B1 * | 1/2016 | Parker | G06V 20/41 |
| 9,282,297 B2 | 3/2016 | Siann et al. | |
| 9,573,684 B2 * | 2/2017 | Kimchi | B64C 39/024 |
| 9,734,644 B2 * | 8/2017 | Samad | H04N 7/186 |

(Continued)

OTHER PUBLICATIONS

Technological Disruption and Innovation in Last-Mile Delivery; 2016. (Year: 2016).*

(Continued)

*Primary Examiner* — Luis Perez-Fuentes
(74) *Attorney, Agent, or Firm* — Barta, Jones & Foley, PLLC (57) ABSTRACT

A delivery monitoring system comprises a portable camera positioned on a delivery person; a camera activation application executed by a mobile electronic device to control a video-generating operation of the portable camera; and a special-purpose processor that outputs a data instruction to an electronic locking device to unlock an entrance to a location for delivering an item by the delivery person only when the portable camera is recording video.

20 Claims, 7 Drawing Sheets

(56) References Cited

U.S. PATENT DOCUMENTS

| | | | |
|---|---|---|---|
| 10,198,711 B2* | 2/2019 | Jones | G06Q 10/06311 |
| 10,217,306 B2* | 2/2019 | Lampert | H04N 7/186 |
| 10,291,538 B2 | 5/2019 | Lin | |
| 10,321,182 B2* | 6/2019 | Herz | G06F 3/04883 |
| 10,366,586 B1 | 7/2019 | Leizerovich et al. | |
| 10,389,983 B1* | 8/2019 | Fu | H04N 7/181 |
| 10,489,742 B2 | 11/2019 | Cheruku et al. | |
| 11,087,602 B2* | 8/2021 | Lark | G03B 17/38 |
| 2005/0007451 A1 | 1/2005 | Chiang | |
| 2005/0104730 A1 | 5/2005 | Yang | |
| 2012/0262581 A1 | 10/2012 | Carter | |
| 2014/0025524 A1 | 1/2014 | Sims et al. | |
| 2014/0258168 A1 | 9/2014 | Crawford | |
| 2015/0120015 A1 | 4/2015 | Fadell et al. | |
| 2015/0310381 A1 | 10/2015 | Lyman et al. | |
| 2016/0026853 A1 | 1/2016 | Wexler et al. | |
| 2016/0098670 A1 | 4/2016 | Oz et al. | |
| 2016/0173833 A1 | 6/2016 | Siann et al. | |
| 2016/0307380 A1 | 10/2016 | Ho et al. | |
| 2018/0073274 A1 | 3/2018 | Johnson et al. | |
| 2018/0108191 A9 | 4/2018 | Ho et al. | |
| 2018/0121875 A1 | 5/2018 | Satyanarayana Rao et al. | |

OTHER PUBLICATIONS

Real-time multi-target tracking by a cooperative distributed vision system; Takashi; 2002. (Year: 2002).*

International Search Report & Written Opinion in PCT/US2019/038687 dated Sep. 5, 2019, 7 pages.

NPL Google Search; 2020 (Year: 2020).

International Preliminary Report on Patentability in International Application No. PCT/US2019/038687, dated Jan. 7, 2021, 6 pages.

Remote Retail Monitoring and Stock Assessment using Mobile Robots; 2014 (Year:2014).

* cited by examiner

BODY MOUNTED CAMERA SYSTEM FOR MONITORING DELIVERIES

CROSS REFERENCE TO RELATED APPLICATION

This application is a continuation of U.S. patent application Ser. No. 16/450,044, filed Jun. 24, 2019, entitled "BODY MOUNTED CAMERA SYSTEM FOR MONITORING DELIVERIES", which claims priority to U.S. provisional patent application Ser. No. 62/692,294, filed Jun. 29, 2018 and entitled "Body Mounted Camera System for Monitoring Deliveries", which are incorporated herein in their entirety by reference.

TECHNICAL FIELD

The technical field generally relates to home delivery security. More particularly, the technical field relates to systems and methods for recording a delivery of goods to a customer's home.

BACKGROUND

As the number of online purchases continues to grow in popularity, there has been a corresponding increase in delivery services. The home delivery of goods involves a delivery driver or other agent of the retail establishment to enter the recipient's property and to place the goods on a doorstep, garage, lock box, or other location in proximity to the house for depositing a package.

BRIEF SUMMARY

In one aspect, a delivery monitoring system comprises a portable camera positioned on a delivery person; a camera activation application executed by a mobile electronic device to control a video-generating operation of the portable camera; and a special-purpose processor that outputs a data instruction to an electronic locking device to unlock an entrance to a location for delivering an item by the delivery person only when the portable camera is recording video.

In another aspect, a method for security during a delivery operation comprises activating a portable camera to generate video during the delivery operation; establishing a network connection between the camera and a storage device for uploading the video; and unlocking an entrance to a location for delivering an item during the delivery operation in response to a determination that a video stream is initiated between the portable camera and the storage device.

BRIEF DESCRIPTION OF THE DRAWINGS

The above and further aspects of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

As delivery services increase in popularity, users desire for goods purchased via online e-commerce transactions to be delivered to a location that is safe from theft, undesirable environmental conditions, or risks of burglary or other crimes when a personal delivery is made to the home, business, or other selected location. Many users would permit a delivery person to enter their homes to deliver packages, even in the absence of a personal recipient of the delivery, but only if acceptable security protocols were implemented to reduce or eliminate such risks.

In brief overview, embodiments of the present inventive concepts include a body camera that streams video over a network while simultaneously storing a copy of the video on the body camera's disk, for example, as a stored or archived electronic copy of the video. The archived video may be of a higher quality than the live stream. The body camera always records video locally, regardless of whether an exception or communication-related interruption occurs during video streaming of the network. The archived video is later uploaded to a cloud hosted file storage. A software application executed at a customer's mobile electronic device such as a smartphone can play the archived video once it has been uploaded successfully. This will permit customers remote from their homes to monitor in real-time or near real-time and/or review stored video of a delivery of an item to the customers' homes for purposes of security or other reasons.

Figure 1:
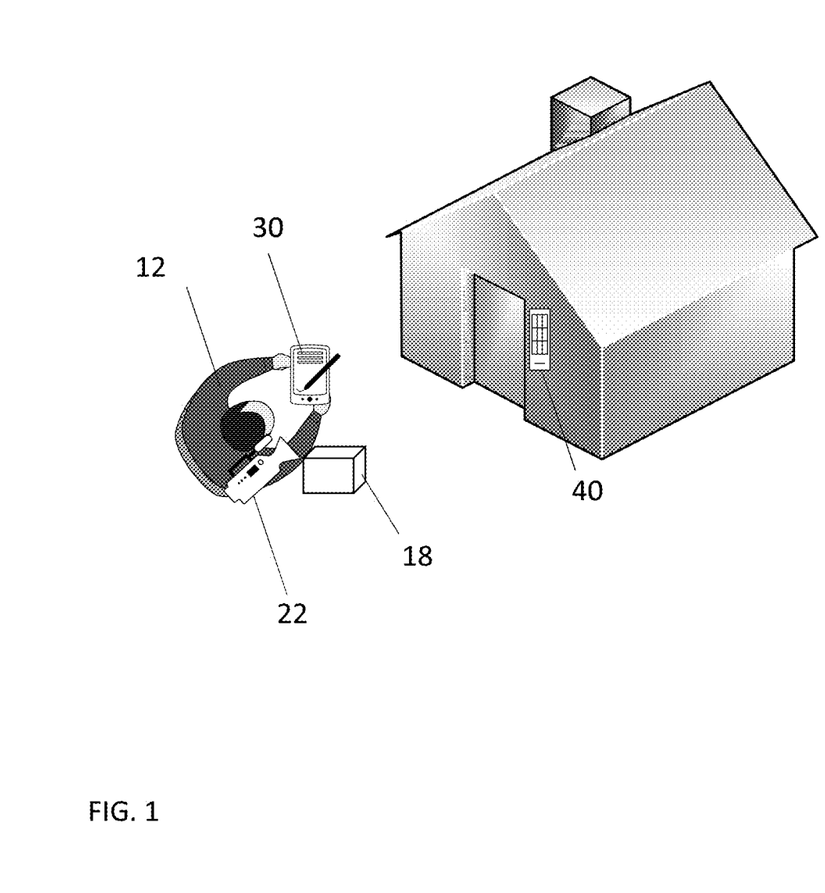
FIG. 1 is a schematic diagram of an environment in which embodiments of the present inventive concepts can be practiced.
Figure 2:
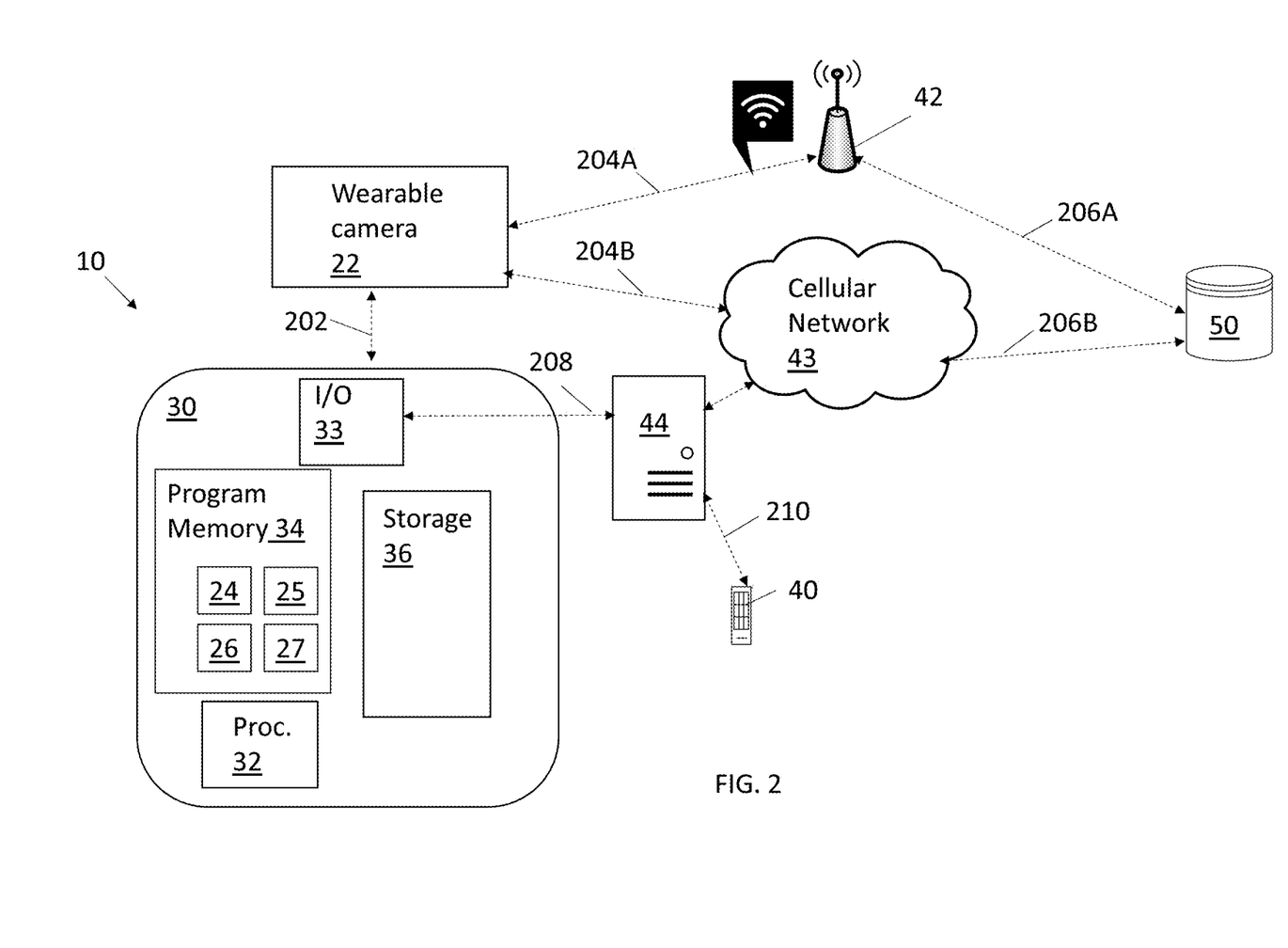
FIG. 2 is a block diagram of a system for home delivery security, in accordance with some embodiments.

FIG. 1 is a schematic diagram of an environment in which embodiments of the present inventive concepts can be practiced. As shown in FIGS. 1 and 2, a delivery monitoring system 10 includes a wearable camera 22, a camera activation application executed by a mobile electronic device 30. In some embodiments, as shown in FIG. 1, the delivery monitoring system 10 may include or otherwise provide data communications with one or more of a WiFi network 42, an electronic locking device 40, an electronic home device controller 44, and a video server 50, also referred to as a media server. The system 10 forms a communication link 202 between the camera 22 and the mobile electronic device 30 so that the software application when executed by a computer processor in the device 30 causes the camera 22 to begin recording when a delivery person 12 delivers an item 18 to a customer's home that is programmed with a programmable door lock 40 or the like. In some embodiments, a user can activate the camera 22 directly to begin recording. This feature of requiring video to be recording in order to gain entry permits the delivery person 12 to enter the home in an unattended and security-conscious manner, i.e., no requirement for a home occupant to be present in the home at the time of delivery.

Figure 7:
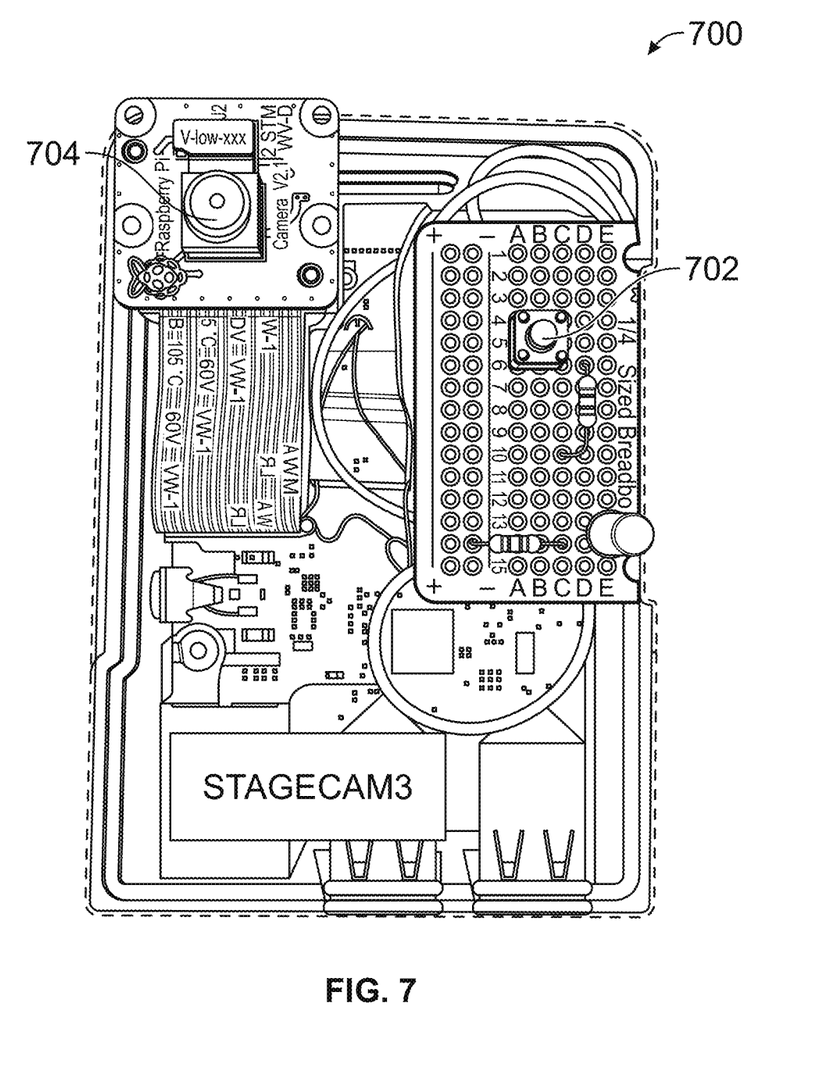
FIG. 7 is a view of an interior of a body mounted camera, which illustrates an arrangement of electronic components of the camera, in accordance with some embodiments.

As shown in FIG. 7, a wearable camera 22 may include a button 702, trigger, or other activation mechanism coupled to a computer element 700 such as a circuit board and related electronic and/or electro-mechanical hardware components surrounded by a housing (not shown) and co-located with other components such as a camera assembly 704. In some embodiments, the button 702 serves as a pairing or reset button or other activation mechanism, and when pressed places the camera 22 into a pairing mode so that the mobile electronic device 30 can form a communication link 202 with the camera 22.

In some embodiments, the wearable camera 22 is a body mounted camera, for example, constructed and arranged for mounting to a person's body, more specifically, to a wearer's head, shoulder, chest, clothing, or any other region of the body that permits the camera 22 to capture frames, video streams, audio, and so on of a field of view in front and/or sides of the delivery person during a delivery of a package 18 or the like to an intended recipient's designated location. The camera 22 is oriented to capture live video during the delivery. In some embodiments, the camera 22 is a vest mounted camera.

The wearable camera 22 includes well-known components for capturing images via a field of view, at least some of which are illustrated in FIG. 7, such as a lens, a circuit that senses light coming from an object through the lens, a controller that processes received light, automated mechanisms such as exposure and auto-focus adjustment functions, and so on. The wearable camera 22 also includes an I/O device such as a Bluetooth™ wireless interface for establishing a communication link 202 with a like I/O interface of the mobile electronic device 30 so as to control the operation of the camera 22, for example, to output a signal that instructs the camera 22 to begin or end recording. In some embodiments, the I/O device may be a WiFi interface. Other wireless network interfaces may equally apply that are capable of uploading real-time or near real-time captured video from the camera 22 to a remote location, such as a video server 50, or a cloud computing network or the like, for example, a Microsoft Azure cloud computing environment.

Figure 6:
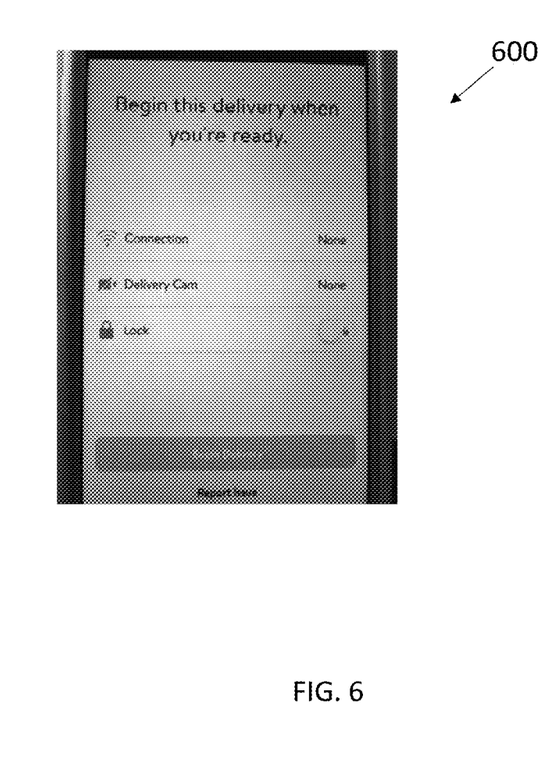
FIG. 6 is a screenshot of a user interface of a computer display, in accordance with some embodiments.

In some embodiments, the mobile electronic device 30 may be a smartphone, laptop computer, electronic notebook, or other personal computing device. Accordingly, the mobile electronic device 30 has a display and a user interface. FIG. 6 illustrates an example of a user interface 600. In addition, the mobile electronic device 30 includes at least one hardware computer processor 32, a memory 34 comprising a plurality of functionality modules, and a data storage 36. The user interface allows the mobile electronic device 30 to create, view and edit the contents of the various modules, databases, or other data storage devices. A number of software functionality modules for implementing delivery functions may be stored in the program memory 34 and executed by the processor 32 on the mobile electronic device 30. Some or all of these functionality modules 24-27 may be executed by the mobile electronic device 30, or executed by a remote computer in communication with the remote electronic device 30, the camera 22, and/or other electronic devices of system such as an electronic home device controller 44 described herein.

One such functionality module includes a camera activation application 24 that communicates with the wearable camera 22 via a communication link 202 such as Bluetooth™ or related network communication exchange.

Another functionality module may include a location module 25, which receives and processes global positioning satellite (GPS) verification data or the like related to a location of the mobile electronic device 30, for example, by communicating with a GPS network, WiFi network device, geofence, or other location technology.

Another functionality module may include a credential module 26 that requests WiFi credentials and/or other authorization-related data from the location-based WiFi network 42, for example, to establish a communication path for a camera video feed taken during a delivery operation. In some embodiments, the WiFi credential module 26 includes a WiFi detection module that generates a signal when WiFi detection is present, which is used by the system to determine whether to activate the camera 22 to begin capturing a video feed, and/or to determine whether to stop a video feed when a WiFi signal is not detected, or no longer detected during a delivery operation.

Another functionality module may include a WiFi credential module 26 includes a video monitoring module 27 that determines when the camera 22 is activated and generating video and communicates electronically with the electronic home device controller 44 and/or electronic locking device 40 to unlock the electronic locking device 40 only when it is established that the camera 22 is recording and the delivery person is a predetermined distance from the door or entrance to the building where the delivery is to be made. In some embodiments, the video monitoring module 27 determines whether the integrity of a network connection is sufficient for transmitting a video stream to the video server 50. For example, the video monitoring module 27 may receive data indicating that the quality of the WiFi network connection 204A, 206A shown in FIG. 2 is poor and prone to blackouts or undesirable WiFi-related errors. Here, the video monitoring module 27 may output a command to the camera 22 to direct the video stream to the video server 50 via a different network connection, or to a different storage device via an LTE hotspot.

Another functionality module may be executed by a special purpose computer hardware processor that verifies if a smart lock 40 is successfully locked or unlocked after a command is generated and received for locking or unlocking the door. This functionality module may be executed and stored at a computer server or the like that is in communication with the mobile electronic device 30 and/or other computer elements of the system. Related features of such functionality modules may include the computer server verifying that the lock was successfully unlocked or if any issues arise with unlocking an electronic locking device 40.

The data storage 36 may include one or more databases or the like that store relevant data for performing home delivery security functions, in accordance with some embodiments. Such data can be accessed by the wearable camera 22, the processor 32, the program memory 34, and/or by a remote computer over a network such as the Internet. Although a data storage 36 is shown as part of a computer, a data storage device 36 may in some embodiments be remote from the computer, for example, located in a cloud or other remote location, and in communication with the processor 32 and memory 34 via direct connection or a network.

After the wearable camera 22 is activated by the mobile electronic device 30, the camera 22 can be used to capture video of a delivery operation, for example, when the delivery person approaches a home of a recipient of a package 18, enters the home, delivers the package 18 in the home, and exits the home. In some embodiments, the delivery person in possession of both the camera 22 and mobile electronic device 30 is a predetermined distance from the home, at which point the home's WiFi network may detect the mobile electronic device 30 for triggering the start of a live capture by the camera 22. In some embodiments, the camera 22 is activated when it is a predetermined distance from the door of the structure where the item(s) are to be delivered. The captured video can be uploaded to a video server 50 or the like by a WiFi network 42 (shown by paths 204A and 206A) or a long term evolution (LTE) hotspot or other cellular network 43 (shown by paths 204B and 206B). In some embodiments, the video may also be stored locally at the camera 22, for example, a compressed version of the video stream, a 1080p quality version stored on a local flash memory device on the mobile electronic device 30, and/or other storage devices. In embodiments where the delivery person returns to a delivery vehicle and is within range of an LTE hotspot or the like in or proximal the delivery vehicle, the camera 22 is constructed and arranged to upload a compressed quality version of the video to the video server 50, and replaces a streamed version of the video.

In some embodiments, a single data stream is exchanged between the wearable camera 22 and the video server 50 to provide video data for both a live video stream and a backup video. The data stream is output to the video server 50 during an item delivery operation, for example, by the delivery person 12. Here, captured video can be simultaneously stored locally at the camera 22, for example, a compressed version of the video stream, a 1080p quality version stored on a local flash memory device on the mobile electronic device 30, and/or other storage device. Here, the video server 50 can provide to the customer requesting a copy of video of some or all of a particular delivery a highest possible quality segment selected from a plurality of segments. After all high-quality segments have been uploaded, for example, for a given delivery operation, the backup video can be processed for availability to the customer.

The WiFi network 42 may include other electronic devices, such as smart devices, Internet of Things (IoT) sensors, for establishing data communications therebetween. One such smart device may include an electronic locking device 40 and am electronic home device controller 44, also referred to as a smart hub, which controls the smart devices such as the electronic locking device 40, both of which can be exchange data via the WiFi network 42 and/or other data communications network or direct connection. During a delivery, the delivery person's mobile electronic device 30 can be used to unlock the electronic locking device 40 (via data paths 208, 210). As described herein, the electronic locking device 40 only unlocks the door or other entry barrier when the system determines that the camera 22 is activated to generate video. In other embodiments, a requirement for unlocking the door is to determine that the video server 50 has received a source of the generated video.

Figure 3:
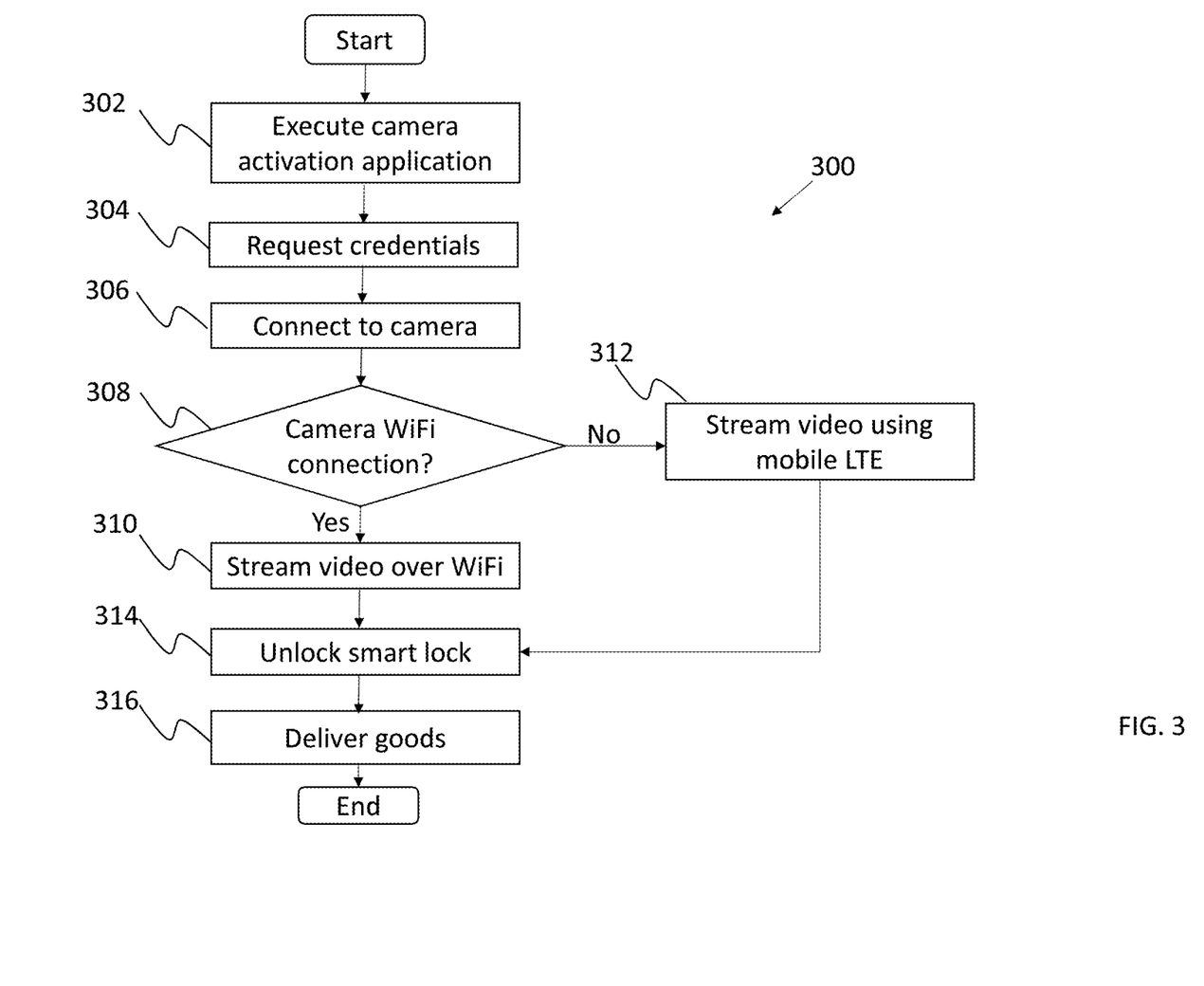
FIG. 3 is a flow diagram of a method for monitoring deliveries, in accordance with some embodiments.

FIG. 3 is a flow diagram of a method 300 for monitoring deliveries, in accordance with some embodiments. One embodiment of the method 300 may be implemented by incorporating some or all of the computing devices of FIGS. 1 and 2.

At block 302, the camera activation application 24 is executed by the mobile electronic device 30. In particular, a delivery person 12 approaches a home, commercial building, or other location designated to receive a package including an item 18 or related order for delivery. The delivery person 12 includes in possession a wearable camera 22, a mobile electronic device 30, and the ordered item 18 as the delivery person 12 approaches the location of interest. In some embodiments, the location of interest is a home or business or other building having a door configured with a lock. In some embodiments, the delivery location may be a lockbox or other container configured with a security lock or the like that is controlled electronically by the smart hub 44 or other programmable apparatus.

At or near the front door of the home or other location of interest, the delivery person 12 may initiate an operation performed by the camera activation application 24. For example, the camera activation application 24 may display at a user interface of the mobile electronic device 30 a display button, icon, or other selectable element that permits a user to initiate a delivery operation from a touchscreen or other computer peripheral device. For example, a "begin delivery" button may be displayed for selection, but is only displayed if the location module 25 confirms a GPS verification and that the delivery is being attempted within a predetermined time period. The time period can be established by estimating the time expected for the delivery person to arrive at the delivery location, for example, based on historical data, navigation tools, or other time generating application. In this example, the predetermined time can be compared to the actual arrival time, and if the actual arrival time is determined to be greater than the predetermined time, the button is not displayed. Similarly, the button is not displayed if the GPS verification is not confirmed.

At block 304, the WiFi credential processor 26 of the mobile electronic device 30 may request customer WiFi credentials such as network name, password, encryption data, and so on from a WiFi network device, such as a WiFi server that is part of the local WiFi network 42. In some embodiments, the delivery location does not have a WiFi network. Here, the method 300 proceeds directly to block 306.

At block 306, in some embodiments, the camera activation application 24 connects with the camera 22 via a Bluetooth™ connection or the like. In doing so, the WiFi credentials (if available) are output from the mobile electronic device 30 to the camera 22. Other embodiments may include any known network connection, such as WiFi, mobile hotspot, or the like executed by the mobile electronic device, e.g., a smartphone or the like. The requisite credentials can be transferred from the mobile electronic device 30, or other computer used as part of the method using Bluetooth Low Energy (BLE), Long Term Evolution (LTE), or other network device and associated protocols supported by the mobile electronic device 30 and/or wearable camera 22.

At decision diamond 308, a determination is made whether the camera 22 can connect to the WiFi network 42. If yes, then the method 300 proceeds to block 310, where captured video is streamed through the WiFi network 42 to a video server 50 or other storage device. However, if at decision diamond 308 a determination is made that a WiFi network is not available or that the camera 22 cannot connect with the WiFi network 42, then the method 300 proceeds to block 312, where another network such as an LTE network is used to stream the captured video.

At block 314, after the video server 50 confirms that the video stream has been initiated, the smart door lock or related electronic locking device 40 is automatically unlocked. Here, the mobile electronic device 30 may output a command to unlock the door. The command is received by the smart hub 44, which in response controls the electronic locking device 40. In some embodiments, security data such as passwords, credentials, and so on are programmed at the mobile electronic device 30 prior to delivery. In some embodiments, the locking device 40 is locked or unlocked by a command signal output from the mobile electronic device 30, which is processed by a server, which in some embodiments is the video server 50, and which in turn processes the command, for example, by approving a door unlock, and outputs the authorized command to the smart hub 44, which communicates with the locking device 40 via a z-wave protocol or the like to unlock the locking device 40. Such security data may be available for processing by the delivery person's mobile electronic device 30 with prior authorization by the home owner or other authorized user, which allows the mobile electronic device 30 to be used to unlock the door in order to deliver the package 18.

At block 316, the package 18 is delivered after the delivery person is granted access to the predetermined delivery location, e.g., the recipient's home or lockbox.

Referring again to FIG. 6, a "begin delivery" button, icon or the like may be displayed at the user interface 600, which when activated initiates a delivery process, including the establishment of the communication link 202, e.g., Bluetooth™ connection with the mobile electronic device 30, for example, displaying the user interface 600, and the camera 22. In addition, the selection of the "begin delivery" button initiates a WiFi connection (if appropriate) between the camera 22 and a video server 50, also referred to as a streaming server, or related storage device in communication with the WiFi network 42, followed by the start of video recording by the camera 22, which can include at least one of a live video stream established with the video server 50 and/or local storage of the recorded video.

Figure 4:
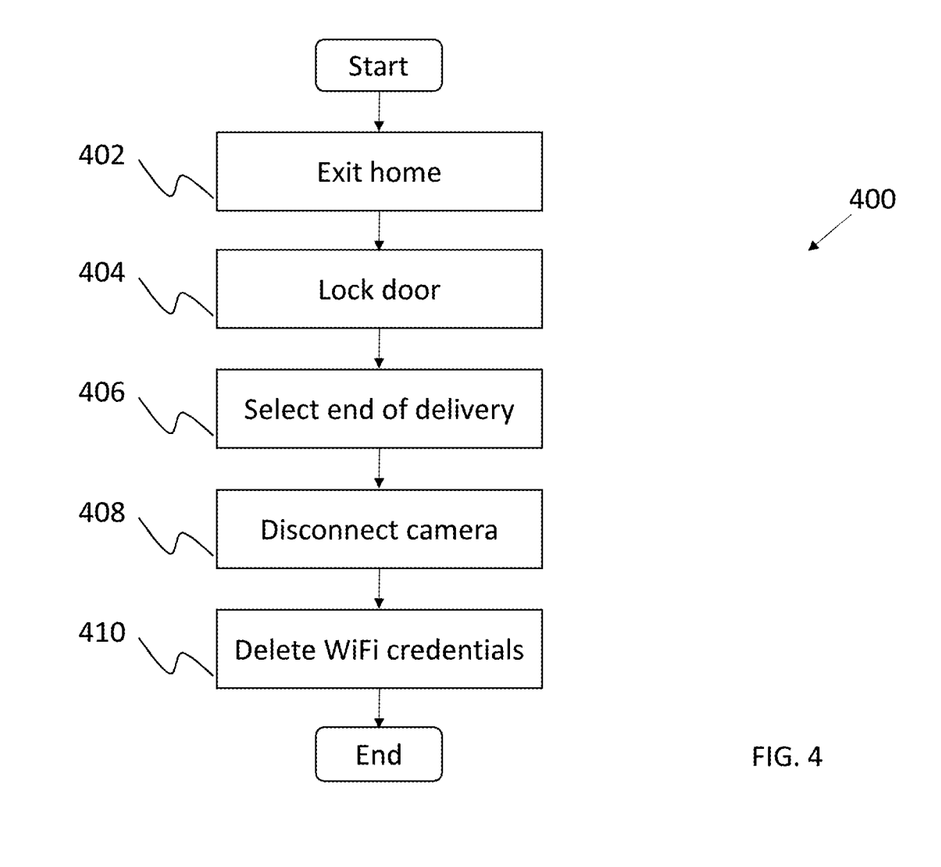
FIG. 4 is a flow diagram of a method for home security after a delivery, in accordance with some embodiments.

FIG. 4 is a flow diagram of a method 400 for home security after a delivery, in accordance with some embodiments. One embodiment of the method 400 may be implemented by incorporating some or all of the computing devices of FIGS. 1 and 2. In some embodiments, the method 400 is initiated after block 316 of the method 300 described with respect to FIG. 3.

At block 402, the delivery person exits the home or other location where a package is delivered.

At block 404, the door is locked after the delivery person exits the home. In some embodiments, the smart door lock or related electronic locking device 40 is automatically locked in response to the mobile electronic device 30 outputting a command to the smart hub 44 or directly to the electronic locking device 40 to lock the door, for example, after the delivery is complete and the delivery associate has exited the home. Various sensors, location detection devices, or the like can communicate with the camera and/or other electronic mobile device of the delivery person, such as a GPS device, to determine the location of the delivery person relative to the home or other delivery location. In doing so, the delivery monitoring system 10 can automatically stop the operation of the camera and/or cease the collection, streaming, and/or other output of video captured during the delivery.

Prior to the foregoing, the delivery person may execute a delivery application displayed on the mobile electronic device, for example, shown in FIG. 6. The delivery application may be executed to lock the door before the application will allow the delivery person to end the delivery operation, and proceed with another task such as a new delivery. The events may be similar as a door unlocking operation described in the method 300 of FIG. 3. In particular, in unlocking, the application outputs a command signal via the video server 50 and/or other intervening computer device to the smart hub 44, which in turn processes the command signal for verification and so on, and the hub sends a command using the z-wave protocol to the locking device 40. The locking device 40 may process the command and generate a response which include a confirmation, error message, or other data that may be received by the server and processed accordingly.

At block 406, the delivery person can select a button, icon, or the like displayed on the mobile electronic device application, which indicates that the delivery operation has ended, and for the camera 22 to cease generating live video feeds. If the door is determined not to be secured, for example, by sensors or the like, then the application will not allow the delivery associate to select the delivery termination button. For example, the application may not display such a button, icon, or the like if the door is not locked.

At block 408, the communication link 202 between the camera 22 and the mobile electronic device 30 is disconnected.

At block 410, the WiFi credentials collected at block 304 are deleted.

In some embodiments, all videos generated before, during, and after the delivery operation are uploaded to the video server 50. The generated videos may be high quality, for example, 1080p, or of a lower quality. As described herein, the videos may be stored locally, then stored, or the videos may be streamed to a separate storage location. In other cases, the video may be generated at a high quality, but stored and/or transferred to a storage location at a lower quality due to a conversion processor in the camera 22 or coupled to the camera 22 in situations where the network is not feasible or otherwise capable of transmitting high quality video.

Figure 5:
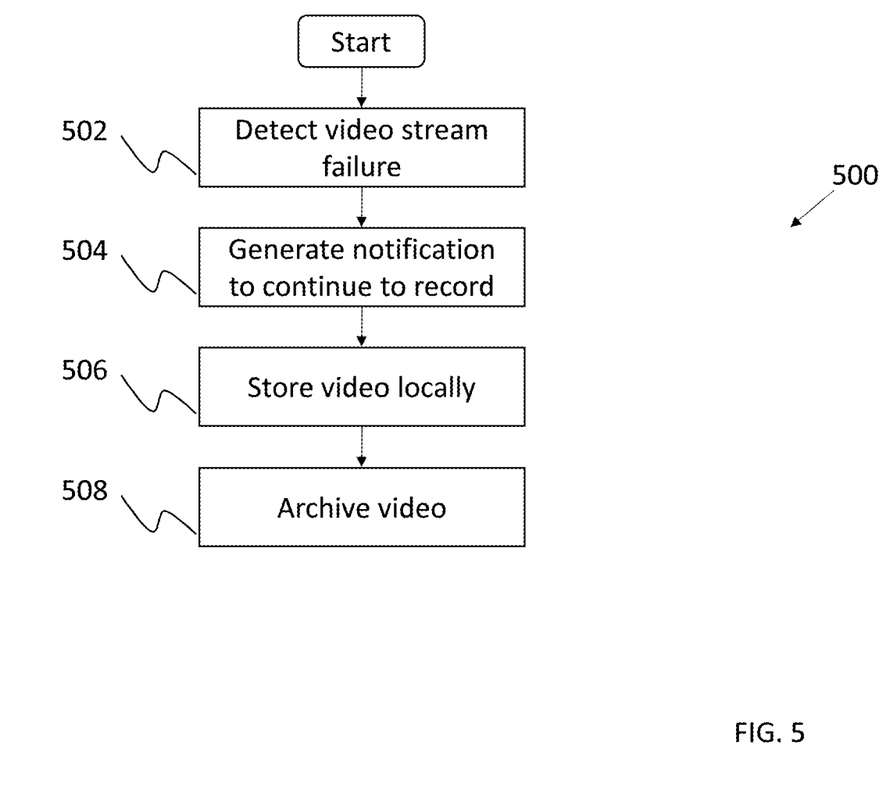
FIG. 5. is a flow diagram of a method for exception handling in a delivery monitoring system, in accordance with some embodiments.

FIG. 5 is a flow diagram of a method 500 for exception handling in a delivery monitoring system, in accordance with some embodiments. One embodiment of the method 500 may be implemented by incorporating some or all of the computing devices of FIGS. 1 and 2. In some embodiments, the method 500 is initiated at block 502 when a video stream failure is detected, WiFi deadzones are present, and/or portions of the video stream are blacked out. If a network connection is lost during a delivery operation where the recorded video cannot be streamed to the video server 50, then a backup storage path may be formed from the camera 22 to a local storage device.

At block 504, a notification signal is generated, for example, by the camera activation application 24 to the camera 22 via the communication link 202, or by a special-purpose processor in the camera 22, that, in response a detection of no WiFi signal, adds a notification to the video feed and instructs the camera 22 to continue record.

At block 506, the captured video is stored locally instead of being output to the video server 50. In some embodiments, the captured video is stored as a different location than via WiFi to the video server 50, for example, streamed in a low-quality format to the delivery person's vehicle, which may include a storage device for temporarily storing the video in the absence of a WiFi signal. Here, a low-resolution video stream is generated, for example, changed from a high-resolution to low-resolution. For example, the delivery vehicle may have a dedicated LTE hotspot to which the camera 22 can automatically connect in order to establish an internet connection over which the low-resolution video can be uploaded to the video server 50. At block 508, the video may be archived.

In some embodiments, the locally stored video is automatically output to the video server 50 along with the notification when a WiFi signal is detected and WiFi communications resume. In embodiments where the delivery person returns to a delivery vehicle and is within range of an LTE hotspot or the like in or proximal the delivery vehicle, the camera 22 is constructed and arranged to uploaded a compressed quality version of the video to the video server 50, and replaces a streamed version of the video.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A delivery monitoring system, comprising:
 a wearable camera communicatively coupled to a mobile electronic device, the wearable camera associated with a delivery person delivering an item to a delivery location, wherein the wearable camera forms a communication link with the mobile electronic device;
 an activation mechanism associated with the wearable camera triggers live capture by the wearable camera based on verifying the wearable camera is within a predetermined distance of the delivery location, the verification performed based on matching network credentials pertaining to the delivery location of the item with credentials of the mobile electronic device; and
 a data storage device associated with the wearable camera, wherein real-time video of delivery of the item is streamed over a network while simultaneously storing a copy of video generated during delivery of the item on the data storage device, wherein a data instruction to unlock an electronic locking device associated with an entrance at the delivery location is transmitted in response to verification the wearable camera is currently generating video and the wearable camera is within the predetermined distance of the delivery location.

2. The delivery monitoring system of claim 1, further comprising:
 a camera activation application executed by the mobile electronic device that remotely controls video-generating operation of the wearable camera via the communication link, wherein the communication link is a long term evolution (LTE) network.

3. The delivery monitoring system of claim 1, further comprising:
 a location module executed by the mobile electronic device that determines a current location of the mobile electronic device, wherein the location module receives and processes global positioning satellite (GPS) verification data that provides the current location of the mobile electronic device and the wearable camera.

4. The delivery monitoring system of claim 1, further comprising;
 a credential module executed by the mobile electronic device that the credential module obtains the credentials pertaining to the delivery location of the item from a data storage.

5. The delivery monitoring system of claim 1, further comprising:
 a video monitoring module executed by the mobile electronic device that outputs a data instruction to unlock an electronic locking device associated with an entrance at the delivery location in response to verification the wearable camera is currently generating the video and the wearable camera is within the predetermined distance of the delivery location.

6. The delivery monitoring system of claim 5, wherein the video monitoring module determines a communication path from the camera to a video storage device.

7. The delivery monitoring system of claim 5, wherein the mobile electronic device outputs the data instruction to lock the electronic locking device and disconnect the wearable camera in response to a completion of a delivery operation.

8. The delivery monitoring system of claim 1, further comprising:
 a video server associated with a location remote from the delivery location, wherein real-time or near real-time captured video is uploaded from the wearable camera to the video server during the delivery.

9. The delivery monitoring system of claim 1, wherein the wearable camera further comprises:
 a pairing mode of the wearable camera, wherein the activation mechanism triggers forming the communication link between the camera and the mobile electronic device in the pairing mode.

10. A method for monitoring a delivery operation, comprising:
 establishing, via an input/output device, a communication link between a wearable camera associated with a delivery person delivering an item to a delivery location and a mobile electronic device, wherein the wearable camera forms a communication link with the mobile electronic device;
 generating, by the wearable camera, video in response to verification the mobile electronic device is within a predetermined distance of the delivery location, the verification performed based on obtained matching network credentials pertaining to the delivery location of the item and a current location of the mobile electronic device, wherein an unlock command is sent to an electronic locking device associated with an entrance to the delivery location giving the delivery person access to the delivery location the wearable camera is within the predetermined distance of the delivery location, the verification performed and the wearable camera is generating the video; and
 streaming, by the wearable camera, generated real-time video of delivery of the item over a network; and
 storing a copy of the video of the delivery on a data storage device associated with the wearable camera.

11. The method of claim 10, wherein the video is generated before, during, and after the delivery, and further comprising:
 establishing a long term evolution (LTE) network connection between the wearable camera and a video storage device for uploading a generated video based on the credentials.

12. The method of claim 11, further comprising:
 locking the electronic locking device, by the mobile electronic device;
 disconnecting the camera from the mobile electronic device; and
 deleting network credentials required for establishing the network connection in response to a completion of the delivery.

13. The method of claim 11, further comprising:
 uploading the video to an alternative storage location in response to a determination of a failure of a video stream established by the network connection.

14. The method of claim 10, further comprising:
 determining, by the mobile electronic device, whether the mobile electronic device is within a predetermined distance from an entrance having the electronic locking device, the entrance associated with an instructed delivery of the item; and
 sending an activation command to the wearable camera to control video-generation operations during a delivery operation in response to a determination the mobile electronic device is within the predetermined distance, the wearable camera including an activation mechanism that receives the activation command and places the wearable camera in a pairing mode with the mobile electronic device so that the mobile electronic device forms a communication link with the wearable camera.

15. A body mounted camera for monitoring deliveries, the body mounted camera comprising:
an input/output device for establishing a communication link with a mobile electronic device, wherein the body mounted camera is communicatively coupled to the mobile electronic device via a network connection, the body mounted camera associated with a delivery person delivering an item to a delivery location;
an activation mechanism associated with the body mounted camera that triggers a video-generating operation based on verifying the mobile electronic device and wearable camera are within a predetermined distance of the delivery location, the verification performed based on matching network credentials pertaining to the delivery location of the item with credentials of the mobile electronic device;
a data storage device on the body mounted camera storing video of a delivery operation generated by the body mounted camera; and
a network device that streams the video generated during the delivery operation at the delivery location in real-time or near real-time to a video server, wherein a video monitoring module executed by a processor outputs a data instruction to unlock an electronic locking device associated with an entrance at the delivery location in response to verification the body mounted camera is actively generating the video during the delivery operation and the delivery person is within a predetermined distance of an entrance to the delivery location.

16. The body mounted camera of claim 15, further comprising:
a locking command to control locking the entrance, wherein the locking command is sent to lock the electronic locking device after delivery of the item; and
a deactivation command, wherein the deactivation command stops the body mounted camera recording the video responsive to confirming a locked state of the electronic locking device and deletes network credentials required for establishing the network connection to complete the delivery of the item.

17. The body mounted camera of claim 15, further comprising:
an alternative storage location, wherein the generated video is automatically uploaded to the alternative storage location by the body mounted camera in response to a failure of a video stream established by the network connection.

18. The body mounted camera of claim 15, further comprising:
a video storage device for storing the generated video, wherein a confirmation is sent from the video storage device to the body mounted camera indicating the video storage device is receiving the generated video from the body mounted camera.

19. The body mounted camera of claim 15, further comprising:
a video storage device, wherein a compressed version of the generated video is uploaded to the video storage device to replace a streamed version of the generated video.

20. The body mounted camera of claim 15, further comprising:
a credential module executed by the mobile electronic device to obtain the credentials from a remote data storage, the credentials pertaining to the delivery location associated with received delivery instructions for the item; and
a video monitoring module executed by the mobile electronic device to receive an indication from a location module that a current location of the mobile electronic device is the delivery location, identify the body mounted camera is activated and generating another video, and output a data instruction to an electronic locking device to unlock the entrance in response to the video monitoring module establishing that the body mounted camera is actively recording the video and the body mounted camera is within the predetermined distance from the entrance where the delivery of the item is to be made.

* * * * *